United States Patent [19]

Rahn et al.

[11] 4,179,388

[45] Dec. 18, 1979

[54] ELECTROSTATOGRAPHIC DEVELOPER WITH SMOOTH SURFACED CARRIER

[75] Inventors: Arthur W. Rahn; Lewis O. Jones; Chin H. Lu, all of Webster, N.Y.

[73] Assignee: Xerox Corporation, Stamford, Conn.

[21] Appl. No.: 788,482

[22] Filed: Apr. 18, 1977

[51] Int. Cl.[2] .......................... G03G 9/10; B32B 27/14

[52] U.S. Cl. .................................... 430/108; 428/407; 428/461; 428/447; 252/62.53; 252/62.55; 430/111

[58] Field of Search .................... 252/62.1 P; 428/402, 428/403, 405, 407

[56] References Cited

U.S. PATENT DOCUMENTS

| | | | |
|---|---|---|---|
| 2,846,333 | 8/1958 | Wilson | 252/62.1 P X |
| 3,099,041 | 7/1963 | Kaufmann | 425/8 X |
| 3,280,036 | 10/1966 | Howell | 252/62.1 P X |
| 3,526,533 | 9/1970 | Jacknow et al. | 252/62.1 P X |
| 3,838,054 | 9/1974 | Trachtenberg et al. | 252/62.1 P |
| 3,839,029 | 10/1974 | Berg et al. | 252/62.1 P X |
| 3,849,182 | 11/1974 | Habenbach | 252/62.1 P X |
| 3,942,979 | 3/1976 | Jones et al. | 252/62.1 P X |
| 4,018,601 | 4/1977 | Hagenbach | 252/62.1 P X |

*Primary Examiner*—Roland E. Martin, Jr.
*Attorney, Agent, or Firm*—Harvey M. Brownrout; Clarence A. Green; James F. Tao

[57] ABSTRACT

Electrostatographic carrier particles having been classified as to have a surface roughness value of less than about 2.0 to provide improved developer life. Developer mixtures and imaging processes employing the described carrier particles are also disclosed.

8 Claims, 1 Drawing Figure

ELECTROSTATOGRAPHIC DEVELOPER WITH SMOOTH SURFACED CARRIER

BACKGROUND OF THE INVENTION

This invention relates in general to electrostatographic imaging systems and, in particular, to improved developer materials and their use.

The formation and development of images on the surface of photoconductive materials by electrostatic means is well known. The basic electrostatographic process, as taught by C. F. Carlson in U.S. Pat. No. 2,297,691, involves placing a uniform electrostatic charge on a photoconductive insulating layer, exposing the layer to a light-and-shadow image to dissipate the charge on the areas of the layer exposed to the light and developing the resulting electrostatic latent image by depositing on the image a finely-divided electroscopic material referred to in the art as "toner." The toner will normally be attracted to those areas of the layer which retain a charge, thereby forming a toner image corresponding to the electrostatic latent image. This powder image may then be transferred to a support surface such as paper. The transferred image may subsequently be permanently affixed to the support surface as by heat. Instead of latent image formation by uniformly charging the photoconductive layer and then exposing the layer to a light-and-shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing step.

Many methods are known for applying the electroscopic particles to the electrostatic latent image to be developed. One development method, as disclosed by E. N. Wide in U.S. Pat. No. 2,618,552 is known as "cascade" development. In this method, developer material comprising relatively large carrier particles having finely-divided toner particles electrostatically clinging to the surface of the carrier particles is conveyed to and rolled or cascaded across the electrostatic latent image-bearing surface. The composition of the toner particles is so chosen as to have a triboelectric polarity opposite that of the carrier particles. In order to develop a negatively charged electrostatic latent image, an electroscopic powder and carrier combination should be selected in which the power is triboelectrically positive in relation to the carrier. Conversely, to develop a positively charged electrostatic latent image, the electroscopic powder and carrier should be selected in which the powder is triboelectrically negative in relation to the carrier. This triboelectric relationship between the powder and carrier depends on their relative positions in a triboelectric series in which the materials are arranged in such a way that each material is charged with a positive electrical charge when contacted with any material below it in the series and with a negative electrical charge when contacted with any material above it in the series. As the mixture cascades or rolls across the image bearing surface, the toner particles are electrostatically deposited and secured to the charged portions of the latent image and are not deposited on the uncharged or background portions of the image. Most of the toner particles accidentally deposited in the background are removed by the rolling carrier, due apparently, to the greater electrostatic attraction between the toner and the carrier than between the toner and the discharged background. The carrier particles and unused toner particles are then recycled. This technique is extremely good for the development of line copy images. The cascade development process is the most wodely used commercial electrostatographic development technique. A general purpose office copying machine incorporating this technique is described in U.S. Pat. No. 3,099,943.

Another technique for developing electrostatic images is the "magnetic brush" process as disclosed, for example, in U.S. Pat. No. 2,874,062. In this method a developer material containing toner and magnetic carrier particles is carried by a magnet. The magnetic field of the magnet causes alignment of the magnetic carriers in a brush-like configuration. This "magnetic brush" is engaged with an electrostatic latent image bearing surface and the toner particles are drawn from the brush to the electrostatic image by electrostatic attraction. Many other methods such as "touchdown" development as disclosed by C. R. May in U.S. Pat. No. 2,895,847 are known for applying electroscopic particles to the electrostatic latent image to be developed. The development processes as mentioned above, together with numerous variations, are well-known to the art through various patents and publications and through the widespread availability and utilization of electrostatographic imaging equipment.

In automatic electrostatographic equipment, it is conventional to employ an electrostatographic plate in the form of a cylindrical drum which is continuously rotating through a cycle of sequential operation including charging, exposure, developing, transfer and cleaning. The plate is usually charged with corona with positive polarity by means of a corona generating device, of the type disclosed by L. W. Walkup in U.S. Pat. No. 2,777,957, which is connected to a suitable source of high potential. After forming, a powder image is electrostatically transferred to a support surface by means of a corona generating device such as the corona device mentioned above. In automatic equipment employing a rotating drum, a support surface to which a powdered image is to be transferred is moved through the equipment at the same rate as the periphery of the drum and contacts the drum in the transfer position interposed between the drum surface and the corona generating device. Transfer is effected by the corona generating device which imparts an electrostatic charge to attract the powder image from the drum to the support surface. The polarity of charge required to effect image transfer is dependent upon the visual form of the original copy relative to the reproduction and the electroscopic characteristics of a developing material employed to effect development. For example, where a positive reproduction is to be made of a positive original, it is conventional to employ a positive polarity corona to effect transfer of a negatively charged toner image to the support surface. When a positive reproduction from a negative original is desired, it is conventional to employ a positively charged developing material which is repelled by the charged areas on the plate to the discharge areas thereon to form a positive image which may be transferred by negative polarity corona. In either case, a residual powder image and, occasionally, carrier particles remain on the plate after transfer. Before the plate may be reused for a subsequent cycle, it is necessary that the residual image and carrier particles, if any, be removed to prevent ghost images from forming on subsequent copies. In the positive-to-positive reproduction process described above, the residual developer powder, as well as any carrier particles present, are tightly retained on the plate surface by a phenomenon that is not fully understood but believed caused by an electric charge. The charge is substantially neutralized by means of a corona generating device prior to contact of the residual powder with a cleaning device. The neutralization of the charge enhances the cleaning efficiency of the cleaning device.

Typical electrostatographic cleaning devices include the "web" type cleaning apparatus as disclosed, for example, by W. P. Graff, et al. in U.S. Pat. No. 3,186,838. In the Graff, Jr., et al. patent, removal of the residual powder and carrier particles from the plate is effected.

While ordinarily capable of producing good quality images, conventional developing systems suffer serious deficiencies in certain areas. In the reproduction of high contrast copies such as letters, tracings and the like, it is desirable to select the electroscopic powder and carrier materials so that their mutual electrification is governed in most cases by the distance between their relative positions in the triboelectric series. However, when otherwise compatible electroscopic powder and carrier materials are removed from each other in the triboelectric series by too great a distance, the resulting images are very faint because the attractive forces between the carrier and toner particles compete with the attractive forces between the electrostatic latent image and the toner particles. Although the image density described in the immediately preceding sentence may be improved by increasing the toner concentration in the developer mixture, undesirably high background toner deposition as well as increased toner impaction and agglomeration is encountered when the toner concentration in the developer mixture is excessive. The initial electrostatographic plate charge may be increased to improve the density of the deposited powder image, but the plate charge would ordinarily have to be excessively high in order to attract the electroscopic powder away from the carrier particle. Excessively high electrostatographic plate charges are not only undesirable because of the high power consumption necessary to maintain the electrostatographic plate at high potentials, but also because the high potential causes the carrier particles to adhere to the electrostatographic plate surface rather than merely roll across and off the electrostatographic plate surface. Print deletion and massive carryover of carrier particles often occur when carrier particles adhere to reusable electrostatographic imaging surfaces. Massive carrier carry-over problems are particularly acute when the developer is employed in solid area coverage machines where excessive quantities of toner particles are removed from carrier particles thereby leaving many carrier particles substantially bare of toner particles. Further, adherence of carrier particles to reusable electrostatographic imaging surfaces promotes the formation of undesirable scratches on the surfaces during image transfer and surface cleaning operations. It is, therefore, apparent that many materials which otherwise have suitable properties for employment as developer materials are unsuitable because they possess unsatisfactory triboelectric properties. In addition, uniform triboelectric surface characteristics of many carrier surfaces are difficult to achieve with mass production techniques. Quality images are in some instances almost possible to obtain in high speed automatic machines when carriers having nonuniform triboelectric properties are employed. Although it may be possible to alter the triboelectric value of an insulating carrier material by blending the carrier material with another insulating material having a triboelectric value remote from the triboelectric value of the original carrier material, relatively larger quantities of additional material is necessary to alter the triboelectric value of the original carrier material. The addition of large quantities of material to the original carrier material to change the triboelectric properties thereof requires a major manufacturing operation and often undesirably alters the original physical characteristics of the carrier material. Further, it is highly desirable to control the triboelectric properties of carrier surfaces to accommodate the use of desirable toner compositions while retaining the other desirable physical characteristics of the carrier. Another factor affecting the stability of the triboelectric properties of developer material is the susceptibility of developer particles to "toner impaction". When developer particles are employed in automatic machines and recycled through many cycles, the many collisions which occur between the carrier particles and other surfaces in the machine cause the toner particles carried on the surface of the carrier particles to be welded or otherwise onto the carrier surfaces. The gradual accumulation of impacted toner material on the surface of the carrier causes a change in the triboelectric value of the carrier and directly contributes to the degradation of copy quality by eventual destruction of the toner carrying capacity of the carrier.

Thus, there is a continuing need for a better developer material for developing electrostatic latent images.

SUMMARY OF THE INVENTION

It is, therefore, an object of this invention to provide developer materials which overcome the above noted deficiencies.

It is yet another object of this invention to provide developer materials having more stable electrostatographic properties.

It is yet another object of this invention to provide developer materials which have a longer developer life.

It is yet another object of this invention to provide developer materials which are less susceptible to toner impaction.

It is yet another object of this invention to provide developer materials which provide higher triboelectric charging values.

It is yet another object of this invention to provide developer materials which are more resistant to film formation of electrostatographic recording surfaces.

Another object of this invention is to provide developer materials which exhibit improved electrical and mechanical properties useful in an electrostatographic apparatus employing magnetic brush development apparatus.

A still further object of this invention is to provide improved developer materials having physical and chemical properties superior to those of known developer materials.

The above objects and others are accomplished, generally speaking, by providing electrostatographic developer materials comprising finely-divided toner particles electrostatically clinging to the surface of classified carrier particles, and carrier particles having been classified as to have a surface roughness value of less than about 2.0. However, it is preferred that the carrier particles of this invention have a surface roughness value of less than about 1.5 because developer quality is improved such as to provide increased copy quality and copy quantity with the developer material in a high speed electrostatographic reproduction apparatus while maintaining low background levels and sustaining solid area development density. Optimum results are obtained when the carrier materials of this invention have a surface roughness value of between about 1.4 and about 1.1.

Generally, the desired properties of electrostatographic carrier particles may be classified into two categories; bulk properties and surface properties. Bulk properties may include such particle characteristics as shape, intrinsic density, and particle size distribution. As to surface properties of electrostatographic carrier particles, the property of primary importance is the triboelectric value which characterizes the ability of the carrier-toner mixture to generate an electrostatic charge of opposite polarity on each of the two component mixture. Further, for maximum electrostatographic properties, the following factors must be considered: (1) the effect of the surface porosity and surface roughness of carrier particles on their ability to generate a triboelectric charge; (a) the effect of the surface roughness of carrier particles on the ultimate properties of carrier particles when coated with a polymer material; and (3) the effect of the surface roughness of carrier particles on the rate of toner impaction of a carrier-toner mixture.

In accordance with this invention, it has now been found that the surface roughness of carrier particles, including uncoated carrier particles and carrier particles having an outer coating layer on an insulating polymer, is critically important in the ability of carrier particles to generate satisfactory triboelectric charging values, in their sensitivity to changes in relative humidity conditions, and in their rate of toner impaction. For the purposes herein, carrier particle surface roughness is defined as the ratio of the BET area measured by gas absorption to that of the calculated geometric surface area of the carrier particles measured by some technique such as sieving. Thus, for the purpose of calculation of the BET value expressed as the surface area in $cm^2$/gram the following formulation is employed.

$$BET=[Q(Vn/1000)(Id/Ic)(0.816)]/Sw$$

where

Q=Constant calculated for a specific Kr/He gas cylinder,

Vn=Volume of nitrogen injected (1),

1000=Converts 1 of nitrogen to cc,

ID=Desorption counts of sample (Kr),

Ic=Calibration counts of nitrogen injection,

Sw=Sample weight, and 0.816=Combined thermal conductivity and STP factor $0.927\times0.880=0.816$.

In the procedure, BET surface area is derived from a single point krypton (Kr) gas adsorption/desorption measurement with helium (He) as the carrier gas and nitrogen gas used for calibration. Krypton is adsorbed on the sample surface when a Kr/He mixture is passed over the sample at liquid nitrogen temperature. Desorption occurs upon removal of the sample from liquid nitrogen and the amount desorbed is proportional to the surface area of the sample. The amount of Kr desorbed is determined by injecting a known volume of nitrogen which has been correlated to the signal from Kr gas. In the foregoing determinations, the apparatus is a Quantasorb Surface Area Analyzer available from Quanta Chrome Corporation, Greenvale, New York.

From the foregoing determinations, it has now been found in electrostatographic copying and/or duplicating processes that where a given carrier material is employed to provide a triboelectric charge to toner particles by contact charge transfer, the degree of roughness of the carrier triboelectric charging surface is critically important. The degree of carrier surface roughness has been found to relate to the degree or extent to which a given toner material can be charged to a useful triboelectric potential or level. Therefore, in accordance with this invention, it has been found that the triboelectric charging capacity of a carrier material is surface roughness dependent and accordingly, this invention may be employed to design optimum developer materials for any given electrostatographic development system.

The effect of surface roughness on the ability of a coated carrier material to generate high triboelectric charge values is graphically depicted in FIG. 1. The carrier material comprises ferrite carrier particles having an average particle size of about 100 microns coated with a styrene-methacrylate-organosilicon terpolymer at varying coating weights. As seen from FIG. 1, for a high roughness carrier core material, i.e., where BET area=1113 $cm^2$/g., sieve area=169 $cm^2$/g; and roughness=6.6, the addition of terpolymer coating thereto from a zero percent coating weight to about 0.6 percent coating weight has no beneficial effect on the triboelectric charge level of the carrier material. At the higher coating weight of about 0.9 percent, there is a slight increase in the triboelectric charge level of the coated carrier material. The ferrite carrier particles having a lower surface roughness, i.e., roughness=2.0, have no incremental triboelectric value at about a 0.3 percent polymer coating weight, but significantly increase at higher coating weights. The ferrite carrier particles having an even lower surface roughness, i.e., roughness=1.2, display an immediate triboelectric charging value at about a 0.3 percent polymer coating weight, and generate the highest triboelectric charge value at the higher polymer coating weights. Thus, the effect of varying the surface roughness of carrier particles is to significantly vary the net triboelectric effect of a given quantity of polymer coating on coated carrier particles. Therefore, for a desired level of triboelectric charge generated on a coated carrier material, both the coated weight and the surface roughness of carrier particles are important factors and may be specified in accordance with this invention.

Any suitable finely-divided toner material may be employed with the carrier materials of this invention. Typical toner materials include those prepared from vinyl resins having a melting point of at least above 43° C. The vinyl resin may be a homopolymer or a copolymer of two or more vinyl monomers. Typical monomeric units which may be employed to form vinyl polymers include: styrene, p-chlorostyrene, vinyl naphthalene; ethylenically unsaturated monoolefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl compounds such as N-vinyl pyrrole, N-vinyl carbazole, N-vinyl indole, N-vinyl pyrrolidene and the like; and mixtures thereof. Generally, suitable vinyl resins employed in the toner have a weight average molecular weight between about 3,000 to 500,000.

Toner resins containing relatively high percentages of a styrene resin are preferred. The presence of a styrene resin is preferred because a greater degree of image definition is generally achieved upon latent image development. Further, denser images are obtained when at least about 25 percent by weight, based on the total weight of resin in the toner, of a styrene resin is present in the toner. The styrene resin may be a homopolymer of styrene or styrene homologues or copolymers of styrene with other monomeric groups containing a single methylene group attached to a carbon atom by a double bond. Thus, typical monomeric materials which may be copolymerized with styrene as addition polymerization include: P-chlorostyrene, vinyl naphthalene, ethylenically unsaturated monoolefins such as ethylene, propylene, butylene, isobutylene and the like; vinyl halides such as vinyl chloride, vinyl bromide, vinyl fluoride; vinyl esters such as vinyl acetate, vinyl propiponate, vinyl benzoate, vinyl butyrate and the like; esters of alpha-methylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like, vinyl ketones such as vinyl methyl ketone, vinyl hexyl ketone, methyl ispropenyl ketone and the like; vinylidene halides such as vinylidene chloride, vinylidene chlorofluoride and the like; and N-vinyl compounds such as N-vinyl pyrole, N-vinyl carbazole, N-vinyl indole, N-vinyl pyrrolidene and the like; and mixtures thereof. The styrene resins may also be formed by the polymerization of mixtures of two or more of these unsaturated monomeric materials with a styrene monomer. The expression "addition polymerization" is intended to include known polymerization techniques such as free radical, anionic and cationic polymerization processes.

The vinyl resins, including styrene type resins, may also be blended with one or more other resins if desired. When the vinyl resin is blended with another resin, the added resin is preferably another vinyl resin because the resulting blend is characterized by especially good triboelectric stability and uniform resistance against physical degradation. The vinyl resins employed for blending with the styrene type or other vinyl resin may be prepared by the addition polymerization of any suitable vinyl monomer such as the vinyl monomers described above. Other thermoplastic resins may also be blended with the vinyl resins of this invention. Typical non-vinyl type thermoplastic resins include: rosin modified phenol formaldehyde resins, oil modified epoxy resins, polyurethane resins, cellulosic resins, polyether resins and mixture thereof. When the resin component of the toner contains styrene copolymerized with another unsaturated monomer or a blend of styrene and another resin, a styrene component of at least about 25 percent by weight based on the total weight of the resin present in the toner is preferred because denser images are obtained and a greater degree of image definition is achieved with a given quantity of toner material.

It is to be understood that the specific formulas given for the units contained in the resins of the toner materials represent the vast majority of the units present, but do not exclude the presence of monomeric units or reactants other than those which have been shown. For example, some commercial materials contain trace amounts of homologues or unreacted or partially reacted monomers. Any minor amount of such substituents may be present in the materials of this invention.

Any suitable pigment or dye may be employed as the colorant for the toner particles. Toner colorants are well known and include, for example, carbon black, nigrosine dye, aniline blue, Calco Oil Blue, chrome yellow, ultramarine blue, duPont Oil Red, Quinoline Yellow, methylene blue chloride, phthalocyanine blue, Malachite Green Oxalate, lamp black, Rose Bengal and mixtures thereof. The pigment or dye should be present in the toner in a sufficient quantity to render it highly colored so that it will form a clearly visible image on a recording member. Thus, for example, where conventional electrostatographic copies of typed documents are desired, the toner may comprise a black pigment such as carbon black, for example, furnace black or channel black, or a black dye such as Amaplast Black dye, available from the National Aniline Products, Inc. Generally, the pigment is employed in an amount from about 1 percent to about 20 percent by weight based on the total weight of the colored toner. If the toner colorant employed is a dye, substantially smaller quantities of colorant may be used. However, since a number of the above pigments used in electrostatographic toner compositions may affect both the glass transition and fusion temperatures of the toner compositions of this invention, their concentration preferably should be about 10 percent by weight of the colored toner.

The toner compositions may be prepared by any well known toner mixing and comminution technique. For example, the ingredients may be thoroughly mixed by blending, mixing and milling the components and thereafter micropulverizing the resulting mixture. Another well known technique for forming toner particles is to spray dry a ball milled toner composition comprising a colorant, a resin, and a solvent.

Any suitable coated or uncoated electrostatographic carrier bead material may be employed as the carrier material of this invention. Typical cascade development process carriers include sodium chloride, ammonium chloride, aluminum potassium chloride, Rochelle salt, sodium nitrate, aluminum nitrate, potassium chlorate, granular zircon, granular silicon, methyl methacrylate, glass and silicon dioxide. Typical magnetic brush development process carriers include nickel, steel, iron, ferrites, and the like. The carriers may be employed with or without a coating. Many of the foregoing and other typical carriers are described by L. E. Walkup et al. in U.S. Pat. No. 2,638,416 and E. N. Wise in U.S. Pat. No. 2,618,552. An ultimate carrier particle diameter between about 30 microns to about 1,000 microns is preshould, for comparative purposes, be conducted under substantially identical conditions.

EXAMPLE I

A developer mixture was prepared by mixing a toner composition comprising a mixture of about 90 parts by weight of a copolymer of about 58.0 percent by weight of styrene and about 42.0 percent by weight of n-butyl methacrylate, and about 10 parts by weight of a furnace carbon black with carrier particles. The carrier particles comprised nickel-zinc ferrite cores having an average particle size of about 85 microns coated with about 0.65% by weight, based on the weight of the core material, of a carrier coating composition comprising styrene, a methacrylate ester, and an organosilicon compound as disclosed in U.S. Pat. No. 3,526,533. The ferrite carrier cores, prior to coating, were determined to have an BET value of about 310 $cm^2/g$ and a surface roughness value of about 1.85. About 1 part by weight of the toner particles was mixed with about 100 parts by weight of the carrier particles to form the developer mixture. Copies of a standard test pattern were made with the developer mixture in an electrostatographic copying machine employing a magnetic brush development system. It was found that the developer mixture failed after about 220,000 copies. Developer failure was experienced in the form of high background, i.e., exceeding the specified 0.01 background density level at 1.0 solid area density.

EXAMPLE II

A developer mixture was prepared by mixing about 1 part of the toner material employed in Example I with about 100 parts of carrier particles. The carrier particles comprised nickel-zinc ferrite cores having an average particle size of about 85 microns coated with about 0.65% by weight, based on the weight of the core material, of a carrier coating composition comprising styrene, a methacrylate ester, and an organosilicon compound as disclosed in U.S. Pat. No. 3,526,533. The ferrite carrier cores, prior to coating, were determined to have a BET value of about 275 $cm^2/g$ and a surface roughness value of about 1.54. Copies of a standard test pattern were made with the developer mixture in an electrostatographic copying machine employing a magnetic brush development system. It was found that the developer mixture failed after about 350,000 copies. Developer failure was experienced in the form of high background, i.e., exceeding the specified 0.01 background density level at 1.0 solid area density.

EXAMPLE III

A developer mixture was prepared by mixing about 1 part of the toner material employed in Example I with about 100 parts of carrier particles. The carrier particles comprised nickel-zinc ferrite cores having an average particle size of about 85 microns coated with about 0.65% by weight, based on the weight of the ore material, of a carrier coating composition comprising styrene, a methacrylate ester, and an organosilicon compound as disclosed in U.S. Pat. No. 3,526,533. The ferrite carrier cores, prior to coating, were determined to have a BET value of about 246 $cm^2/g$ and a surface roughness value of about 1.48. Copies of a standard test pattern were made with the developer mixture in an electrostatographic copying machine employing a magnetic brush development system. It was found that the developer mixture failed after about 450,000 copies. Developer failure was experienced in the form of high background, i.e., exceeding the specified 0.01 background density level at 1.0 solid area density.

EXAMPLE IV

A developer mixture was prepared by mixing about 1 part of the toner material employed in Example I with about 100 parts of carrier particles. The carrier particles comprised nickel-zinc ferrite cores having an average particle size of about 85 microns coated with about 0.65% by weight, based on the weight of the core material, of a carrier coating composition comprising styrene, a methacrylate ester, and an organosilicon compound as disclosed in U.S. Pat. No. 3,526,533. The ferrite carrier cores, prior to coating, were determined to have a BET value of about 213 $cm^2/g$ and a surface roughness value of about 1.24. About 1part by weight of the toner particles was mixed with about 100 parts by weight of the carrier particles to form the developer mixture. Copies of a standard test pattern were made with the developer mixture in an electrostatographic copying machine employing a magnetic brush development system. It was found that the developer mixture failed after about 520,000 copies. Developer failure was experienced in the form of high background, i.e., exceeding the specified 0.01 background density level at 1.0 solid area density.

Thus, from Examples I–IV it can be seen that carrier and developer life increases from about 220,000 to about 520,000 satisfactory copies as the BET value of the carrier core material decreases.

From the foregoing disclosure, it has been shown that carrier materials having the defined characteristics enable the provision of improved copy quality experienced in reduced toner deposits in background areas. In addition, developer materials of this invention are further characterized as resulting in improved machine performance with longer systems life, that is, these developer materials provide substantially improved triboelectric charging properties of the developer mixtures for substantially longer periods of time thereby increasing the developer life of the developer mixtures and decreasing the time intervals between replacement of the developer materials. Further still, the developer materials of this invention may be characterized as providing dense toner images and are particularly useful in magnetic brush development systems. Thus, by providing the developer materials of this invention, substantial improvements in systems life due to intrinsic developer life result upon the classification and use of developer materials having the specified physical characteristics.

In addition, the developer materials of this invention may be further characterized as experiencing substantially reduced impaction rates resulting in more stable triboelectric charging properties of the developer mixtures for substantially longer periods of time thereby increasing the developer life of the developer mixtures and decreasing the time intervals between replacement of the developer materials.

The expressions "developing material" and "developer mixture" as employed herein are intended to include toner material or combinations of toner material and carrier material.

Although specific materials and conditions are set forth in the above examples of making and using the developer materials of this invention, these are merely intended as illustrations of the present invention. These and other carrier materials, toner materials, substituents, ferred because the carrier particles then possess sufficient density and inertia to avoid adherence to the electrostatic images during the cascade development process. For magnetic brush development, the carrier particles generally have an average diameter between about 30 microns and about 250 microns. Generally speaking, satisfactory results are obtained when about 1 part toner is used with about 10 to 200 parts by weight of carrier.

The carrier materials of this invention may be coated with any suitable coating material. Typical electrostatic carrier particle coating materials include vinyl chloride-vinyl acetate copolymers, styrene-acrylate-organosilicon terpolymers, natural resins such as caoutchouc, colophony, copal, dammar, Dragon's Blood, jalap, storax; thermoplastic resins including the polyolefins such as polyethylene, polypropylene, chlorinated polyethylene, and chlorosulfonated polyethylene; polyvinyls and polyvinylidenes such as polystyrene, polymethylstyrene, polymethyl methacrylate, polyacrylonitrile, polyvinyl acetate, polyvinyl alcohol, polyvinyl butyral, polyvinyl chloride, polyvinyl carbazole, polyvinyl ethers, and polyvinyl ketones; fluorocarbons such as polytetrafluoroethylene, polyvinyl fluoride, polyvinylidene fluoride; and polychlorotrifluoroethylene; polyamides such as polycaprolactam and polyhexamethylene adipamide; polyesters such as polyethylene terephthalate; polyurethanes; polysulfides, polycarbonates; thermosetting resins including phenolic resins such as phenol-formaldehyde, phenol-furfural and resorcinol formaldehyde; amino resins such as urea-formaldehyde and melamineformaldehyde; polyester resins; epoxy resins; and the like. Many of the foregoing and other typical carrier coating materials are described by L. E. Walkup in U.S. Pat. No. 2,618,551; B. B. Jacknow et al. in U.S. Pat. No. 3,526,433; and R. J. Hagenbach et al. in U.S. Pat. Nos. 3,533,835 and 3,658,500.

When the carrier materials of this invention are coated, any suitable electrostatographic carrier coating thickness may be employed. However, a carrier coating having a thickness at least sufficient to form a thin continuous film on the carrier particle is preferred because the carrier coating will then possess sufficient thickness to resist abrasion and prevent pinholes which adversely effect the triboelectric properties of the coated carrier particles. Generally, for cascade and magnetic brush development, the carrier coating may comprise from about 10.0 percent by weight based on the weight of the coated carrier particles. Preferably, the carrier coating should comprise from about 0.3 percent to about 1.5 percent by weight based on the weight of the coated carrier particles because maximum durability, toner impaction resistance, and copy quality are achieved. To achieve further variation in the properties of the coated composite carrier particles, well known additives such as plasticizers, reactive and non-reactive polymers, dyes, pigments, wetting agents and mixtures thereof may be mixed with the coating materials.

When the carrier materials of this invention are coated, the carrier coating composition may be applied to the carrier cores by any conventional method such as spraying, dipping, fluidized bed coating, tumbling, brushing and the like. The coating compositions may be applied as a powder, a dispersion, solution, emulsion or hot melt. When applied as a solution, any suitable solvent may be employed. Solvents having relatively low boiling points are preferred because less energy and time is required to remove the solvent subsequent to application of the coating to the carrier cores. If desired, the coating may comprise resin monomers which are polymerized in situ on the surface of the cores or plastisols gelled in situ to a non-flowable state of the surface of the cores. Surprisingly, it has been found that for a given inefficient coating process, carrier core materials having the specific surface roughness designated in this invention result in increased effective area, that is, triboelectric charging coated area per unit weight. Thus, increased carrier active surface area increases the net toner material triboelectric charge level for a given toner concentration by weight in a developer mixture.

Any suitable organic or inorganic photoconductive material may be employed as the recording surface with the developer materials of this invention. Typical inorganic photoconductor materials include: sulfur, selenium, zinc sulfide, zinc oxide, zinc cadmium sulfide, calcium strontium sulfide, cadmium sulfide, mercuric iodide, mercuric oxide, mercuric sulfide, indium trisulfide, gallium selenide, arsenic disulfide, arsenic trisulfide, arsenic triselenide, antimony trisulfide, cadmium sulfo-selenide and mixtures thereof. Typical organic photoconductors include: guinacridone pigments, phthalocyanine pigments, triphenylamine, 2,4-bix(4,4'-diethylamino-phenol)-1,3,4-oxadiazol N-isopropylcarbazol, triphenylpyrrol, 4,5-diphenylimidazolidinone, 4,5-diphenyl-imidazolidinethione, 4,5-bis-(4'-amino-phenyl)-imidazolidinone, 1,5-dicyanonaphthalene, 1,4-dicyanonaphthalene, aminophthalodinitrile, nitrophthalodinitrile, 1,2,5,6-tetraazacyclooctatetraene-(2,4,6,8)-2-mercaptobenzothiazole-2-phenyl-4-diphenylideneoxazolone, 6-hydroxy-2,3-di(p-methoxy-phenyl)-benzofurane, 4-dimethylaminobenzylidenebenzhydrazide, 3-benzylidene-aminocarbazole, polyvinyl carbazole, (2-nitrobenzylidene)-p-bromoaniline, 2,4-diphenylquinazoline, 1,2,4-triazine, 5-diphenyl-3-methyl-pyrazoline, 2-(4'-dimethylaminophenyl)-benzoxazole, 3-aminecarbazole, and mixtures thereof. Representative patents in which photoconductive materials are disclosed include U.S. Pat. No. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

DESCRIPTION OF THE PREFERRED EMBODIMENTS

Figure 1:
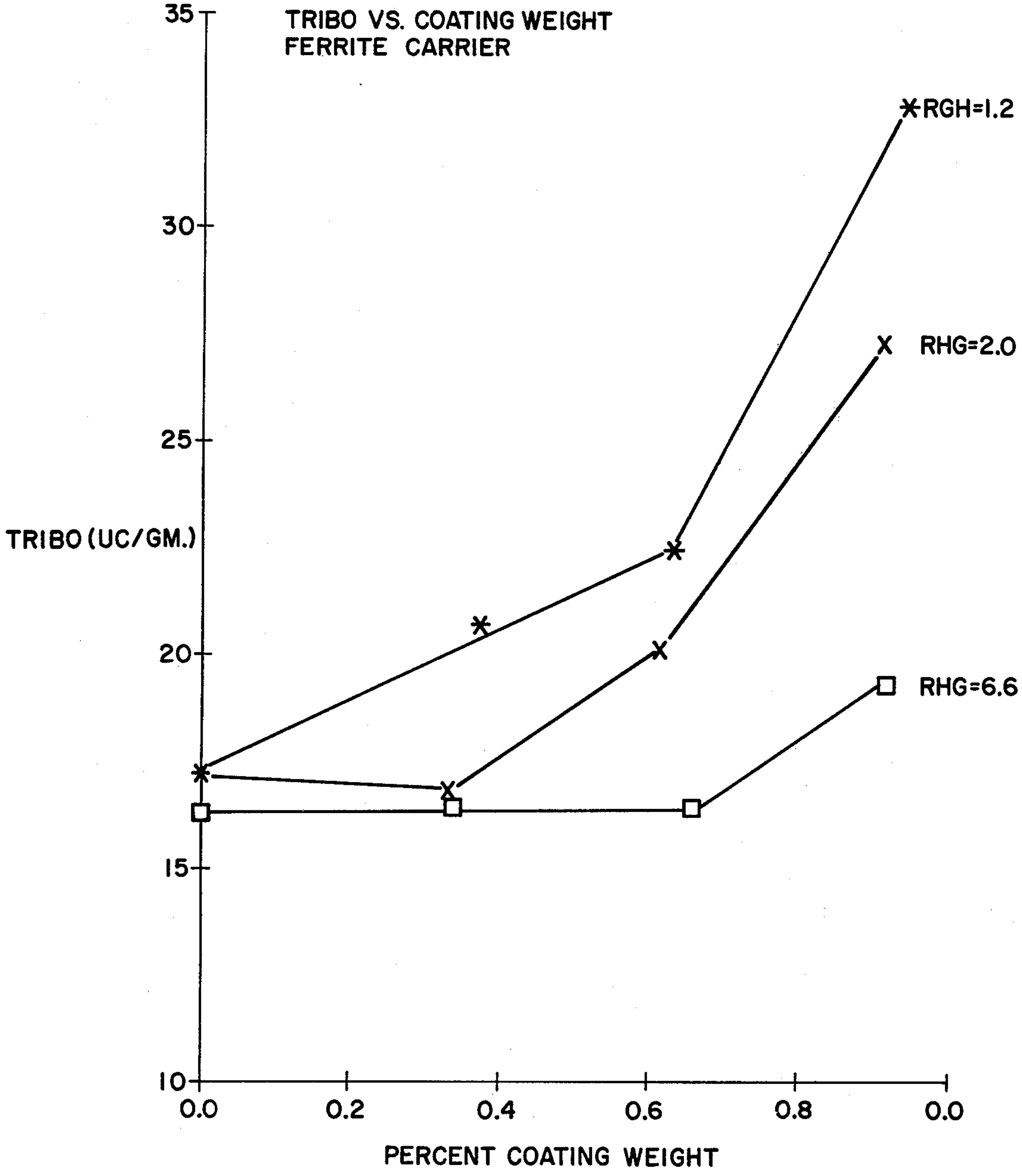

The following examples further define, describe and compare methods of preparing the developer materials of the present invention and of utilizing them to develop electrostatic latent images. Parts and percentages are by weight unless otherwise indicated.

In the following examples, the relative triboelectric values generated by contact of carrier beads with toner particles is measured by means of a Faraday Cage. The device comprises a brass cylinder having a diameter of about one inch and a length of about one inch. A 400-mesh screen is positioned at each end of the cylinder. The cylinder is weighed, charged with about 0.5 gram mixture of carrier and toner particles and connected to ground through a capacitor and an electrometer connected in parallel. Dry compressed air is then blown through the brass cylinder to drive all the toner from the carrier. The charge on the capacitor is then read on the electrometer. Next, the chamber is reweighed to determine the weight loss. The resulting data is used to calculate the toner concentration and the charge in microcoulombs per gram of toner. Since the triboelectric measurements are relative, the measurements and processes, such as those listed above, may be substituted for those in the Examples with similar results.

Other modifications of the present invention will occur to those skilled in the art upon a reading of the present disclosure. These are intended to be included within the scope of this invention.

What is claimed is:

1. An electrostatographic developer mixture comprising finely-divided toner particles electrostatically clinging to the surface of classified carrier particles, said carrier particles having an average diameter of between about 30 microns and about 1,000 microns, said carrier particles having been classified as to have a surface roughness value of less than about 2.0 wherein said surface roughness value is defined as the ratio of the BET area measured by gas absorption to that of the calculated geometric surface area of said carrier particles, and wherein said carrier particles have a polymeric resin coating thereon.

2. Carrier particles for electrostatographic development of electrostatic latent images, said carrier particles having an average diameter of between about 30 microns and about 1,000 microns, said carrier particles having been classified as to have a surface roughness value of less than about 2.0 wherein said surface roughness value is defined as the ratio of the BET area measured by gas absorption to that of the calculated geometric surface area of said carrier particles, and wherein said carrier particles have a polymeric resin coating thereon.

3. Carrier particles for electrostatographic development of electrostatic latent images in accordance with claim 2 wherein said carrier particles have been classified as to have a surface roughness value of less than about 1.5.

4. Carrier particles for electrostatographic development of electrostatic latent images in accordance with claim 2 wherein said carrier particles have been classified as to have a surface roughness value of between about 1.4 and about 1.1

5. Carrier particles for electrostatographic development of electrostatic latent images in accordance with claim 1 wherein said carrier particles are magnetic and are selected from the group consisting of nickel, steel, iron, and ferrites.

6. Carrier particles for electrostatographic development of electrostatic latent images in accordance with claim 2 wherein said coating is present in an amount of from about 0.1 percent to about 10.0 percent by weight based on the weight of the coated carrier particles.

7. Carrier particles for electrostatographic development of electrostatic latent images in accordance with claim 2 wherein said coating is present in an amount of from about 0.3 percent to about 1.5 percent by weight based on the coated carrier particles.

8. Carrier particles for electrostatographic development of electrostatic latent images in accordance with claim 2 wherein said coating comprises a terpolymer of styrene, a methacrylate ester and an organosilicon.

* * * * *